(12) United States Patent
Doken

(10) Patent No.: US 12,244,890 B2
(45) Date of Patent: *Mar. 4, 2025

(54) SYSTEMS AND METHODS FOR DETECTING AND ANALYZING AUDIO IN A MEDIA PRESENTATION ENVIRONMENT TO DETERMINE WHETHER TO REPLAY A PORTION OF THE MEDIA

(71) Applicant: Adeia Guides Inc., San Jose, CA (US)

(72) Inventor: Serhad Doken, Bryn Mawr, PA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/108,253

(22) Filed: Feb. 10, 2023

(65) Prior Publication Data

US 2023/0283843 A1    Sep. 7, 2023

Related U.S. Application Data

(63) Continuation of application No. 17/574,432, filed on Jan. 12, 2022, now Pat. No. 11,606,606.

(51) Int. Cl.
| | |
|---|---|
| *H04N 21/8547* | (2011.01) |
| *G10L 25/57* | (2013.01) |
| *G11B 27/00* | (2006.01) |
| *H04N 21/433* | (2011.01) |
| *H04N 21/442* | (2011.01) |
| *H04N 21/472* | (2011.01) |
| *H04N 21/475* | (2011.01) |

(52) U.S. Cl.
CPC ..... *H04N 21/44213* (2013.01); *G11B 27/005* (2013.01); *H04N 21/433* (2013.01); *H04N 21/47217* (2013.01); *H04N 21/4758* (2013.01); *H04N 21/8547* (2013.01); *G10L 25/57* (2013.01)

(58) Field of Classification Search
CPC .......... H04N 21/44213; H04N 21/433; H04N 21/47217; H04N 21/4758; H04N 21/8547; G10L 25/57
See application file for complete search history.

(56) References Cited

U.S. PATENT DOCUMENTS

| | | | |
|---|---|---|---|
| 7,761,892 B2 | 7/2010 | Ellis et al. | |
| 8,972,262 B1 | 3/2015 | Buryak | |
| 10,149,008 B1 * | 12/2018 | Logan | ................ H04N 21/8405 |
| 10,341,742 B1 | 7/2019 | Kim et al. | |
| 10,390,097 B1 * | 8/2019 | Lee | ........................ G06Q 50/01 |
| 2014/0163980 A1 | 6/2014 | Tesch et al. | |
| 2015/0271442 A1 | 9/2015 | Cronin et al. | |
| 2021/0409833 A1 | 12/2021 | Supinski et al. | |

* cited by examiner

*Primary Examiner* — Thai Q Tran
*Assistant Examiner* — Jose M Mesa
(74) *Attorney, Agent, or Firm* — Haley Guiliano LLP

(57) ABSTRACT

Systems and methods for detecting and analyzing audio in a media presentation environment to determine whether to replay missed portions of media content are disclosed herein. In an embodiment, one or more computing devices detect audio in a media presentation environment. The one or more computing devices determine whether the audio relates to the media being presented. If the audio does not relate to the media being presented, the one or more computing devices cause replaying a portion of the media presentation corresponding to when the audio was being detected.

20 Claims, 7 Drawing Sheets

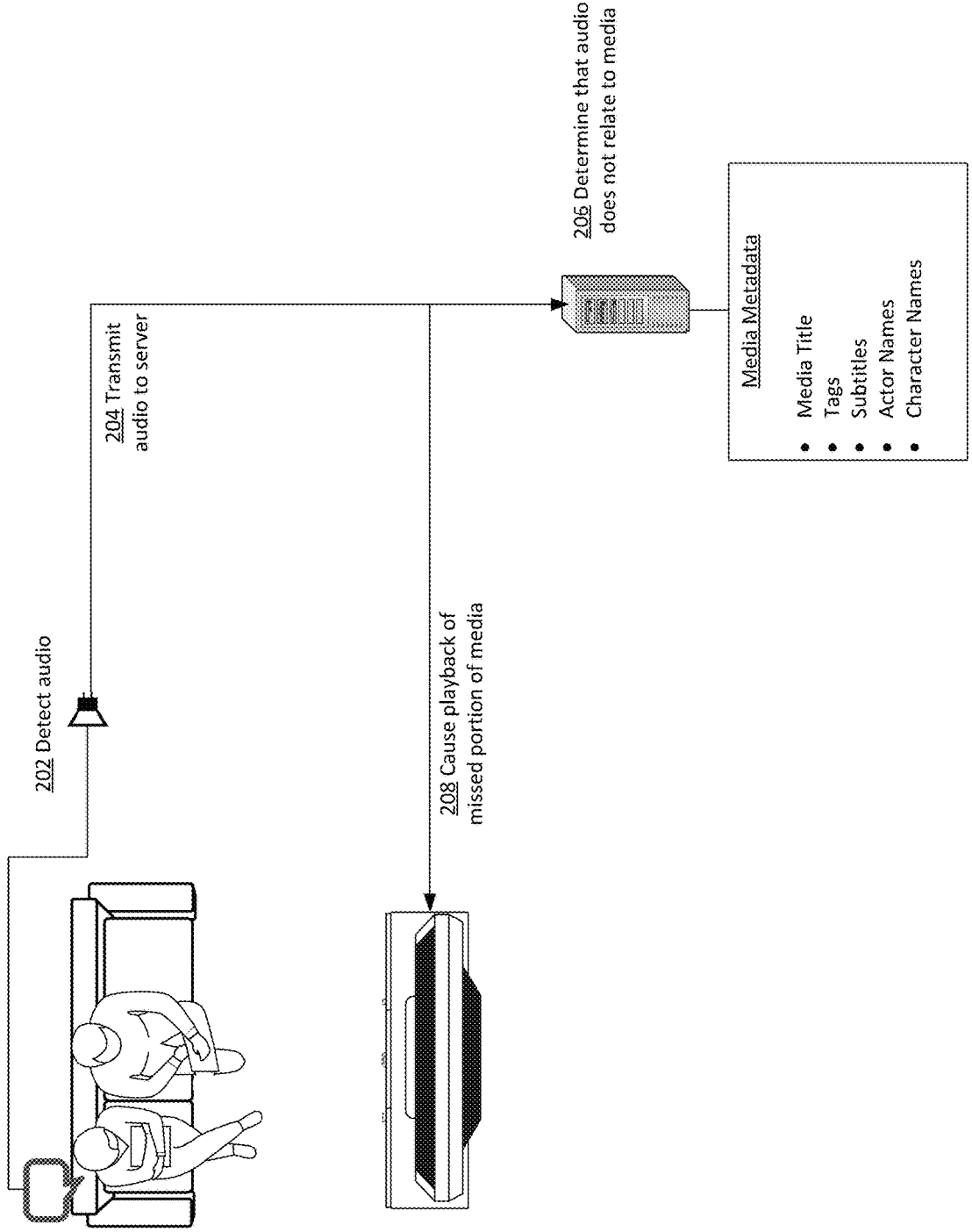

SYSTEMS AND METHODS FOR DETECTING AND ANALYZING AUDIO IN A MEDIA PRESENTATION ENVIRONMENT TO DETERMINE WHETHER TO REPLAY A PORTION OF THE MEDIA

CROSS-REFERENCE TO RELATED APPLICATION

This application is a continuation of U.S. patent application Ser. No. 17/574,432, filed Jan. 12, 2022, the disclosure of which is incorporated by reference in its entirety.

BACKGROUND

This disclosure is generally directed to media presentation and audio detection. In particular, methods and systems are provided for replaying missed portions of media based on detected audio.

SUMMARY

During playback of media content (e.g., a movie), background conversations may cause segments of the media content to be missed. For example, a conversation about dinner may interrupt segments of a film, causing important content to be missed. Currently, if content is missed due to background conversation, manual input needs to be received to rewind the media content that was interrupted by the background noise. This method is inefficient as media navigation techniques do not always provide utility to identify an exact moment in time when a media segment should be replayed.

To address the aforementioned problem, in one approach, systems detect noise in a media presentation environment and automatically replay media segments when the detected noise exceeds a threshold value. While this approach is beneficial in that it automates the replaying of segments, the approach can be overinclusive, thereby wasting computing resources by causing the system to rewind too often. Some approaches set different thresholds based on complexity of audio or limit rewinds to important scenes, but these approaches are also deficient as they can miss rewinding scenes where a watcher was distracted but the audio was not complex or can cause rewinds when the watchers were commenting on the media content directly.

To overcome such deficiencies, methods and systems are described herein for adaptive replay of a portion of a media asset based on analysis of noise in the presentation environment. In an embodiment, a system analyzes noise in the presentation environment during playback of the media asset to detect a plurality of words being spoken in the presentation environment. The plurality of words being spoken in the presentation environment are then compared to metadata of the media asset to determine whether the words being spoken are related to the media asset. If the words being spoken are unrelated to the media asset, a portion of the media asset is replayed.

The present disclosure addresses the problems of computer resource waste by minimizing the rewinding of media assets to only situations where the words being spoken in the presentation environment are unrelated to the media asset. Other embodiments further address the problems of computer resource waste by providing an option to rewind the media asset to a prior point with the option disappearing over time, thereby reducing computer resource waste by only rewinding when the option is selected.

In some embodiments, the adaptive replay of the portion of the media asset is performed in a watch party setting. A watch party setting, as used herein, refers to simultaneous display of the media asset at separate devices. In some embodiments, the system detects noise that is being transmitted to other devices through the watch party setting and analyzes the transmitted noise to determine relevance to the media asset. In other embodiments, the system detects noise at one of the device environments, such as noise picked up by a microphone but not transmitted to the other devices.

DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 2 depicts a system and method for replaying portions of a media presentation based on detected audio in a presentation environment;

DETAILED DESCRIPTION

Figure 1:
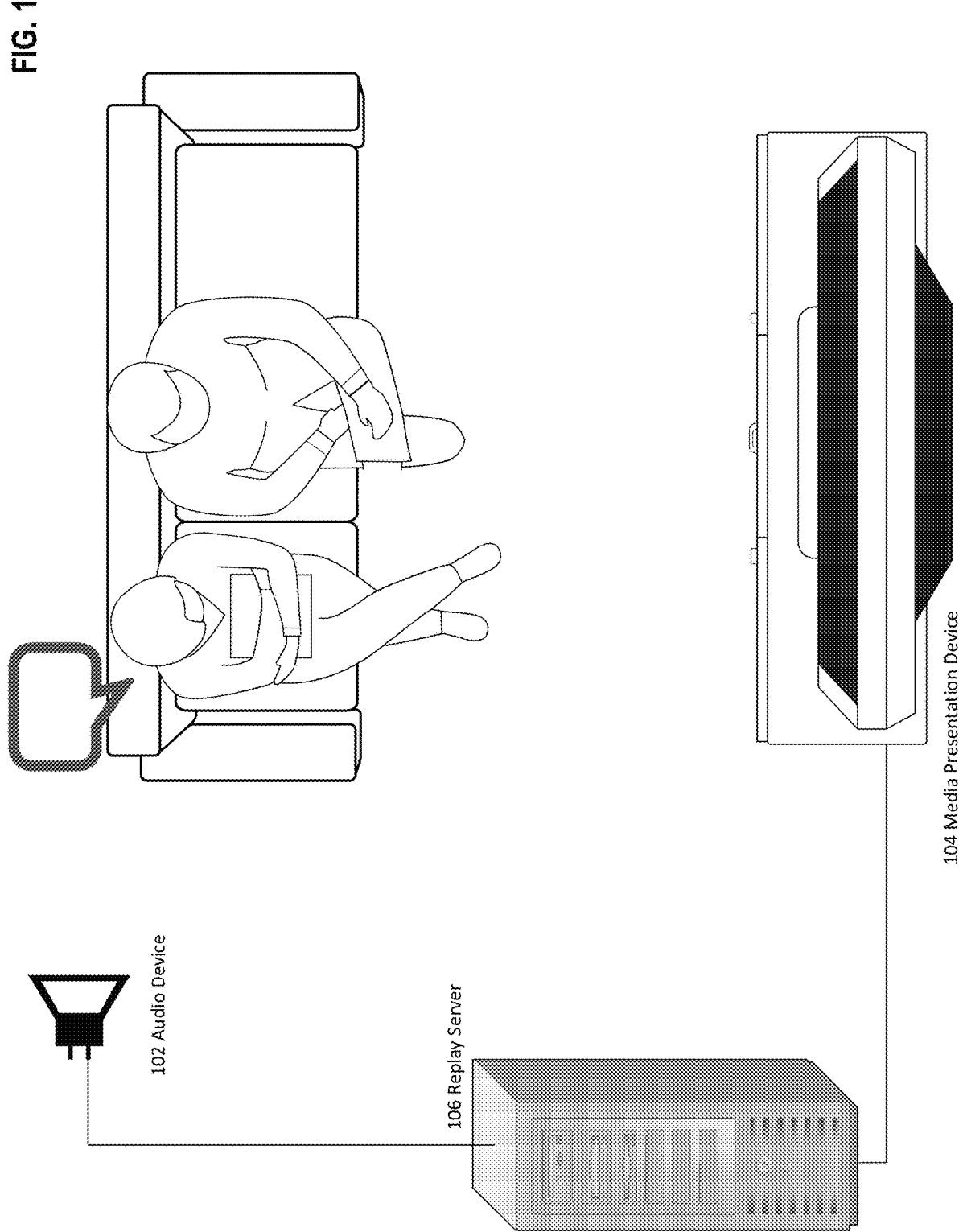
FIG. 1 depicts a system for replaying portions of a media presentation based on detected audio in a presentation environment.

FIG. 1 depicts a system for replaying portions of a media presentation based on detected audio in a presentation environment. FIG. 1 depicts a particular configuration of elements for the purpose of providing a clear example of the methods described herein. Other implementations may utilize more or less elements than depicted in FIG. 1. For example, a client-side implementation may be performed at a device without audio being sent to an external server computer. As another example, a separate media server may transmit the media to the media presentation device 104.

In the embodiment of FIG. 1, an audio device 102 is configured to detect noise in a presentation environment of a media presentation device 104. Media presentation device 104 may comprise a computing device configured to display media, such as audio or video. Examples of media presentation device include a television, personal computer, or mobile computing device. The audio device 102 may comprise a microphone in one or more devices external to the media presentation device 104, such as a smart home hub; mobile computing device, such as a smartphone, tablet, or entertainment system; a remote control; or headset with a wired or wireless connection to a computing device. Additionally or alternatively, the audio device 102 may be integrated into the media presentation device 104, such as through a microphone in a smart television, mobile computing device, or personal computer.

In some embodiments, the audio device 102 transmits detected audio to a replay server 106. Replay server 106 comprises one or more computing devices configured to analyze detected audio to determine whether the detected audio is related to media being presented on the media presentation device 104 and to cause replay of a portion of the media on the media presentation device 104. In some embodiments, the replay server 106 additionally provides the media to the presentation device 104. In other embodiments, the replay server 106 is separate from the media provider and transmits requests to the media provider and/or causes the media presentation device 104 to transmit requests to the media provider to replay portions of the media on the media presentation device 104. In some embodiments, the replay server 106 generates transcriptions of the audio detected by audio device 102. In other embodiments, the transcriptions are generated by an external server computer to which the audio is sent.

While embodiments are generally described with respect to a replay server 106 analyzing audio and sending commands to a media presentation device 104, in other embodiments, the analyzing of audio and determination as to whether to replay portions of the media presentation are performed at the media presentation device 104. For example, the media presentation device may receive the detected audio, determine whether to replay portions of the media presentation using the methods described herein, and cause replay of the portions of the media presentation, such as through sending a request to a media server.

FIG. 2 depicts a system and method for replaying portions of a media presentation based on detected audio in a presentation environment. At step 202, an audio device detects audio in a location proximate to a media presentation device, such as through a microphone located near or in the media presentation device. In an embodiment, the audio device further determines that the audio is different from the media being presented on the media presentation device using filtering techniques, examples of which are discussed herein.

At step 204, the audio device transmits the audio to a replay server. For example, in response to detecting the audio in the presentation environment, the audio device may begin recording the audio and transmitting the recorded audio over a network to the replay server. In some embodiments, the audio device only transmits the audio to the replay server if audio is detected for more than a threshold period of time. For example, in response to initially detecting the audio, the audio device may identify a start time of the audio and monitor for additional audio. If a threshold period of time passes without additional audio, such as five seconds, the audio device may identify an end time of the audio based on a last recorded time when additional audio was detected. If the difference between the start time of the audio and the end time of the audio is greater than a threshold amount of time, such as 2 seconds, the audio device may transmit the audio to the server. If the difference between the start time of the audio and the end time of the audio is less than the threshold amount of time, the audio device may not transmit the audio to the server. Additionally or alternatively, the audio device may begin transmitting audio to the server once a threshold time has passed since the start time of the audio if audio is still being detected.

At step 206, the replay server determines that the recorded audio comprises a distraction from the media being presented, such as by determining that the recorded audio does not relate to the media being presented, detecting that a watcher is engaged with the recorded audio through a video feed captured by a camera, identifying different voices speaking back and forth, or detecting a voice from a non-watcher party and detecting a subsequent response from a watcher entity. As an example of determining that the recorded audio does not relate to the media being presented, the replay server may generate a transcription of the audio transmitted by the audio device through known transcription techniques. Additionally or alternatively, the replay server may receive a transcription of the audio from a transcription server which receives the audio from the audio device and/or replay device with a request to provide a transcription of the audio. The replay server may access metadata of the media being presented and determine whether the transcription of the audio matches the metadata of the media being presented. If the transcription of the audio matches the metadata of the media, the replay server may determine that the audio relates to the media being presented. If the transcription of the audio does not match the metadata of the media, the replay server may determine that the audio does not relate to the media being presented.

As used herein, the metadata of the media refers to information relating to the media being presented by the display device and may include title of the media, names of characters in the media, names of performers of the media, names of creators of the media, genre of the media, tags generated in association with the media, soundtrack information for the media, and/or any other data associated with the media. For example, metadata for an audio book may include the author, character names, chapter names, genre, or other plot elements. Metadata for a television show may include a title of the show, episode titles, character names, actor names, director names, producer names, locations, or other information relating to the show.

In some embodiments, the metadata of the media includes a transcription of the media. For example, metadata for an audio book or podcast may include a script or book text while metadata for a television show or movie may include subtitles generated for the television show or movie. In some embodiments, the metadata includes transcriptions of media up to a current point in the media. For example, if a portion of an audio book being narrated is at halfway through the book, the media metadata may include the first half of the book, but not the second half of the book. Similarly, if the media being presented is the ninth episode of a television show, the metadata of the media may include subtitles of the first eight episodes of the show. The same follows for multiple seasons of a show, multiple books in a series, or multiple movies in a series.

In some embodiments, the metadata of the media includes information related to other media. For example, the metadata for a movie with a particular actor may include identifiers of other movies with the particular actor and any information associated with the other movies, such as subtitles, character names, or actors. Similarly, metadata for a song may include information for other songs on a same album, other songs by a same singer, and/or other songs in a same genre.

Determining that the transcription of the detected audio matches the metadata of the media being presented may be performed using any of a number of comparison techniques. For example, the replay server may remove common words, such as articles, prepositions, or conjunctions, from the metadata of the media and/or the transcription of the detected audio. The replay server may then determine a number of words in the transcription of the detected audio that can be found in the metadata of the media. If a percentage of words in the transcription of the detected audio that can be found in the metadata of the media is greater than a threshold percentage, such as 80%, the replay server may determine that the transcription of the media matches the metadata of the media. Other comparison techniques may include generating a matching value as a function of matching words or matching n-grams with weights applied based on length of the words/n-grams and/or based on the uniqueness of the words/n-grams in a general data repository.

In some embodiments, the replay server identifies a language of the detected audio and/or sends the detected audio to a language recognition server with a request to detect a language of the detected audio. The replay server may be configured to compare the detected audio to a version of the metadata in the detected language. For example, if the media being played is in English and the detected audio is in Spanish, the replay server may compare the transcription of the detected audio with Spanish subtitles of the media.

In some embodiments, the replay server identifies a subset of the metadata of the media to compare to the transcription of the audio. For example, the replay server may identify a plurality of characters in a particular scene of a television show. The replay server may identify metadata associated with the characters in the particular scene, such as previous dialog lines of the characters that are in the particular scene, actor names of the characters in the particular scene, and/or other media including the actors portrayed in the particular scene or episode. The replay server may then compare the metadata corresponding to the particular scene with the audio transcription using the techniques described herein. In some embodiments, the replay server identifies the subset of the metadata of the media that corresponds to a threshold amount of time from a current progression point when the audio is detected, such as within ten seconds. The subset of the metadata may include subtitles from the last ten seconds and/or subtitles from characters displayed on the screen over the last ten seconds.

In some embodiments, the metadata of the media includes external information. For example, the replay server may perform a search for articles that include a title of the media. The replay server may include information from the article and/or information relating to events referenced in the article as part of the metadata of the media. External information may include social media or other supplemental content associated with the media, such as social media posts, comments, or other discussions.

In an embodiment, the replay server additionally identifies a timestamp in the media that corresponds to the initial detection of the audio in the presentation environment. The identification of the timestamp may be performed in a plurality of ways. For example, if the audio device is in communication with the media presentation device and/or is integrated into the media presentation device, the media presentation device may identify the timestamp when the audio is initially detected and transmit the timestamp to the replay server. Additionally or alternatively, the media presentation device may store data identifying the timestamp without transmitting the timestamp to the replay server. As another example, the replay server may receive data identifying a time when the audio was detected from the audio device. The replay server may determine, through a request to the media presentation device or a media server, the timestamp of the media presentation at the time when the audio was detected. Additionally or alternatively, if the replay server is transmitting the media to the media presentation device, the replay server may determine the timestamp of the media that is being transmitted to the media presentation device at the time when the audio was detected.

At step 208, the replay server causes playback of a missed portion of the media. For example, the replay server may cause the media presentation device to stop playing the media presentation at a current playback timestamp and start playing the media presentation at a timestamp determined based on a timestamp identified by the replay server as corresponding to the initial detection of the audio in the presentation environment, such as at the identified timestamp, a few seconds prior to the identified timestamp, or at the start of a scene corresponding to the identified timestamp. In some embodiments, the timestamp is determined based, at least in part, on a length of the detected audio. For example, the replay server may be configured to cause replay at the identified timestamp if the length of the detected audio is less than a threshold length, such as ten seconds, and cause replay at the beginning of a scene corresponding to the identified timestamp if the length of the audio is greater than the threshold length.

Causing the media presentation to stop playing the media presentation at the current playback timestamp and start playing the media presentation at the determined timestamp may comprise sending a request to an external server which is providing the media presentation, sending a request to the media presentation device to send a request to an external server that is providing the media presentation, sending a request to the media presentation device if the media presentation device is providing the media presentation, such as through a non-transitory computer-readable media, sending a portion of the media presentation to the media presentation device that begins at the determined timestamp, or otherwise instructing the media presentation device to cause playback of the media presentation at the determined timestamp.

In some embodiments, the replay server causes the media presentation device to begin storing a portion of the media presentation in response to initial detection of the audio and/or in response to the determination that the audio comprises a distraction from the media being presented, such as a determination that the audio does not relate to the media being presented. For example, the replay server may cause the media presentation device to begin storing a portion of the media beginning at the identified timestamp in a buffer, thereby allowing quick playback of the portion of the media at the identified timestamp.

In some embodiments, the replay server causes the playback of the missed portion of the media in response to determining that the recorded audio does not relate to the media being presented and/or in response to determining that the detected noise in the presentation environment lasted for longer than a threshold period of time. In some embodiments, the replay server causes display of an option to cause playback of the missed portion of the media in response to determining that the recorded audio does not relate to the media being presented and/or in response to determining that the detected noise in the presentation environment lasted longer than a threshold period of time. In response to receiving input selecting the option, such as through a voice command or controller input, the replay server causes playback of the missed portion of the media.

In some embodiments, replay positions and thresholds are determined based, at least in part, on metadata of the media being presented and/or profile information for a user. For example, the replay server may store data indicating that a first media item includes a first threshold period of time for determining that detected audio does not relate to the media being presented and a second media item includes a second threshold period of time that is different from the first threshold period of time. As another example, the replay server may store data indicating that a replay timestamp for a first show is at the timestamp corresponding to detection of the audio while the replay timestamp for a second show is at the beginning of a scene. Similarly, different user profiles may include different thresholds and/or replay rules.

Figure 3A:
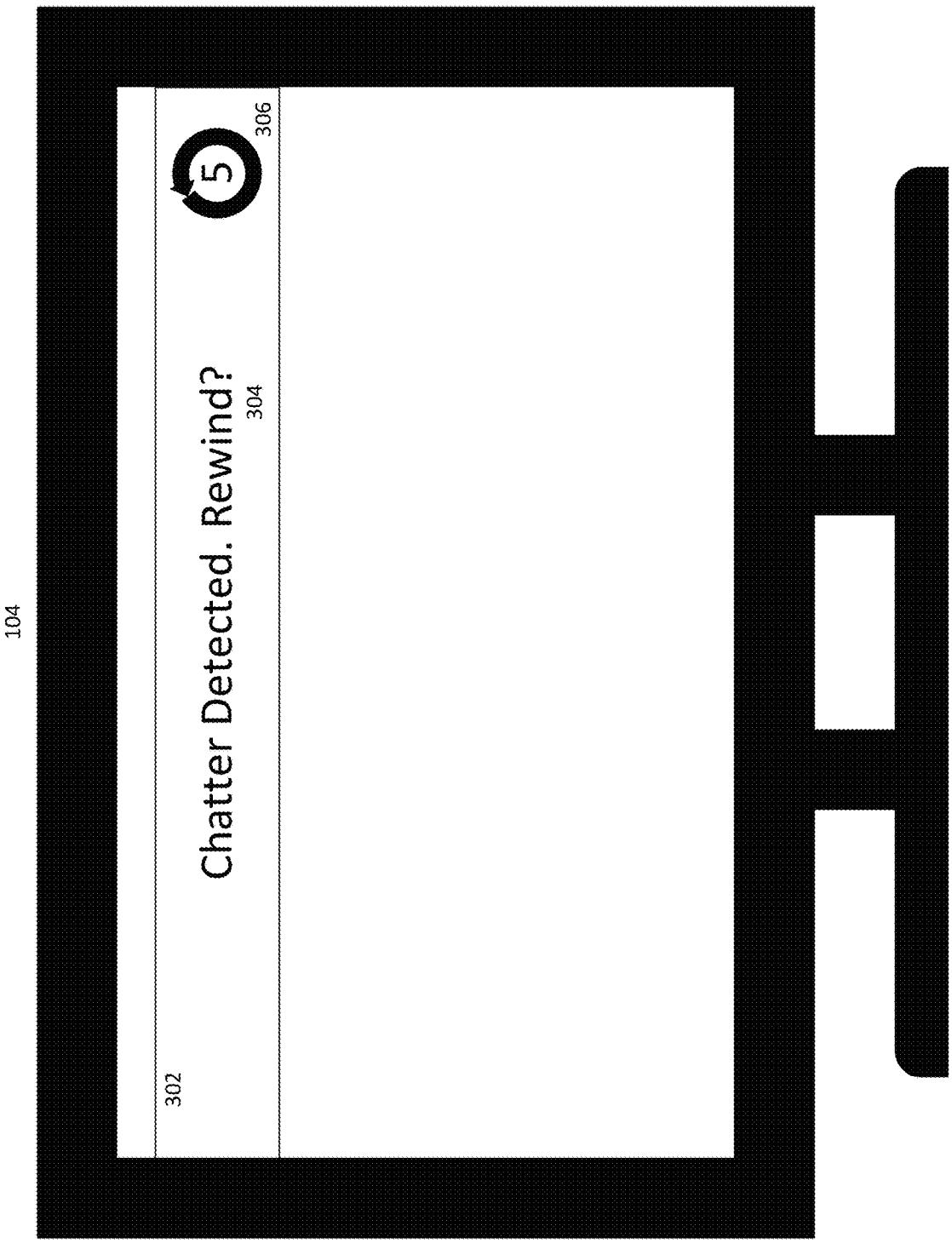
FIG. 3A-3B depicts an example of an option for causing playback of a missed portion of a media presentation.

FIG. 3A depicts an example of an option for causing playback of a missed portion of a media presentation. Media presentation device 104 includes overlay 302. Overlay 302 comprises reply option 304 and countdown timer 306. Replay option 304 comprises a selectable option which, when selected causes the media presentation device 104 to cause playback of the missed portion of the media presentation. Overlay 302 may be displayed in response to the detection of audio that does not relate to the media being presented and/or in response to a determination that the detected noise in the presentation environment lasted for longer than a threshold period of time.

In some embodiments, the overlay 302 includes the countdown timer 306. Countdown timer 306 comprises an interface element indicating a length of time within which the replay option may be selectable. For example, countdown timer 306 of FIG. 3A depicts five seconds left to determine to select the replay option. In an embodiment, when the countdown timer reaches 0, the overlay 302 is removed from the display. The countdown timer may start counting down when audio is no longer detected in the media presentation environment. Thus, if audio is detected in the media presentation environment for ten seconds and the overlay is displayed after two seconds of audio is detected, the overlay may be displayed for an additional eight seconds before the countdown commences.

In some embodiments, the media presentation device enters an "analysis mode" when the overlay 302 is displayed. In the analysis mode, the media presentation device is configured to detect and analyze audio in the presentation environment. The media presentation device may enter "analysis mode" to determine whether audio input is received requesting a selection of the replay option 304. For example, the media presentation device may be configured to determine if detected audio in the media presentation environment comprises a command to replay the missed portion of the media segment when the overlay 302 is being displayed.

In some embodiments, the replay server stores data identifying timestamps in the media being presented that correspond to detected audio. For example, the replay server may store data identifying, for each instance of detected audio, a timestamp in a media presentation and words in the detected audio. In some examples, the replay server uses the words to enhance metadata for the media presentation. For example, the replay server may identify words that are commonly spoken during a particular media presentation or moment in the media presentation, such as a scene, based on stored words from a plurality of instances of audio being detected in a presentation environment during the media presentation or moment of the media presentation. The replay server may update the metadata of the media presentation to include the commonly spoken words.

In some embodiments, the replay server identifies timestamps in the media being presented that correspond to detected audio that does not relate to the media being presented. For example, the replay server may use identified timestamps from a plurality of instances of audio being detected in a presentation environment that does not relate to the media being presented to determine times that most commonly include detected audio that does not relate to the media being presented. In some embodiments, the replay server additionally modifies the media at the determined times, such as by inserting other media segments into the media. For example, if audio that is not related to the media is commonly detected at five minutes into the media presentation, the replay server may insert an advertisement into the media presentation at five minutes into the media presentation.

In some embodiments, the media presentation environment is a physical space, such as a living room. In other embodiments, the media presentation environment is a virtual space, such as a "watch party." A "watch party," as used herein, refers to an environment where a media presentation is displayed simultaneously on a plurality of selected devices over a network. The devices may additionally be communicatively coupled, such that audio detected by a first device of the plurality of devices is transmitted to a second device of the plurality of devices.

In some embodiments, the replay server is configured to cause replay of missed portions of the media presentation only if audio proximate to a device of the plurality of devices in the watch party is transmitted to or played on another device of the plurality of devices. For example, if a microphone is muted where the audio is detected and/or if the other devices in the watch party have muted the audio coming from the device where the audio is detected, the replay server may be configured to not replay the missed portions of the media presentation and/or not provide an option to replay the missed portions of the media presentation. In some examples, the replay server is configured to replay the missed portions of the media presentation only if the audio proximate to the device of the plurality of devices in the watch party is played at a volume higher than a threshold volume on another device.

Figure 3B:
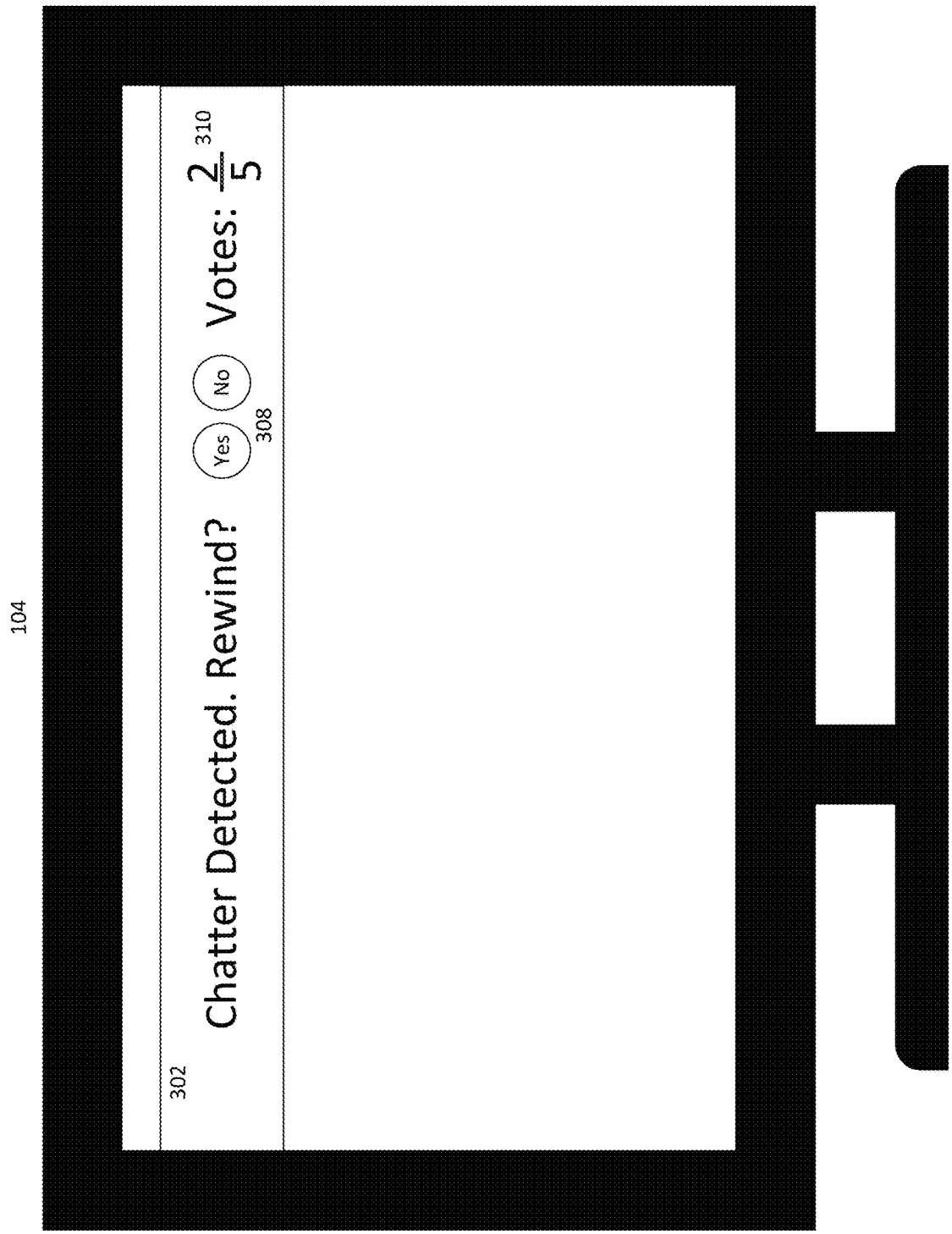

In some embodiments, the replay server causes display of an option to replay missed portions of the media presentation on a particular device, such as a device designated as a "host" of the watch party or a device where the audio was initially detected. In some embodiments, the replay server causes display of an option to vote on whether to replay the missed portions of the media presentation on the plurality of devices. FIG. 3B depicts an example of an option for voting to cause playback of a missed portion of a media presentation. In FIG. 3B, overlay 302 comprises voting options 308 and vote count 310. If the vote succeeds, such as through a majority of affirmative votes or unanimous affirmative votes, the replay server may cause the replay of the missed portions of the media presentation. In some embodiments, the option to vote may be displayed in response to input from a device of the plurality of devices where an initial option was displayed. For example, if detected audio is transmitted to a particular device, an option may be displayed on the particular device to initiate a vote. In response to a selection of the option, the replay server may cause display of an option at each device to vote on whether to replay missed portions of the media presentation.

In some embodiments, the replay server detects audio that is not transmitted to played on other devices. For example, a watch party application may include an option for a participant to mute themselves or for other participants to mute a particular participant. If detected audio that is not transmitted is determined to be related to the media being presented, the replay server may display a notification on the device where the audio was detected indicating that the audio was not transmitted to other devices.

In some embodiments, the replay server causes replay of the missed portion of the media at a different point in time. For example, if audio is only detected proximate to one device and not transmitted over the network, the replay server may cause display of an option to record the missed portion of the media for replay at a later point in time. If the option is selected, the replay server may identify the missed portion based on the initial timestamp and a timestamp corresponding to when the detected audio stopped and store data identifying that portion of the media. The replay server may cause display of an option to play that portion of the media at a later point in time, such as after the watch party has concluded, thereby allowing a user to catch up on missed portions of the media that did not affect other users of the watch party.

In some embodiments, detected audio in a watch party may be used to generate data relating to the watch party. For example, the replay server may store data indicating a number of times audio was detected that did not relate to the media asset, a number of times a replay of a missed portion of the media was performed, and/or which devices originated the audio that was not related to the media asset or that caused a replay of the missed portion of the media asset. The replay server may use the generated data to provide a display of information relating to the watch party and/or to generate recommendations, such as a recommendation to mute a particular device.

Figure 4:
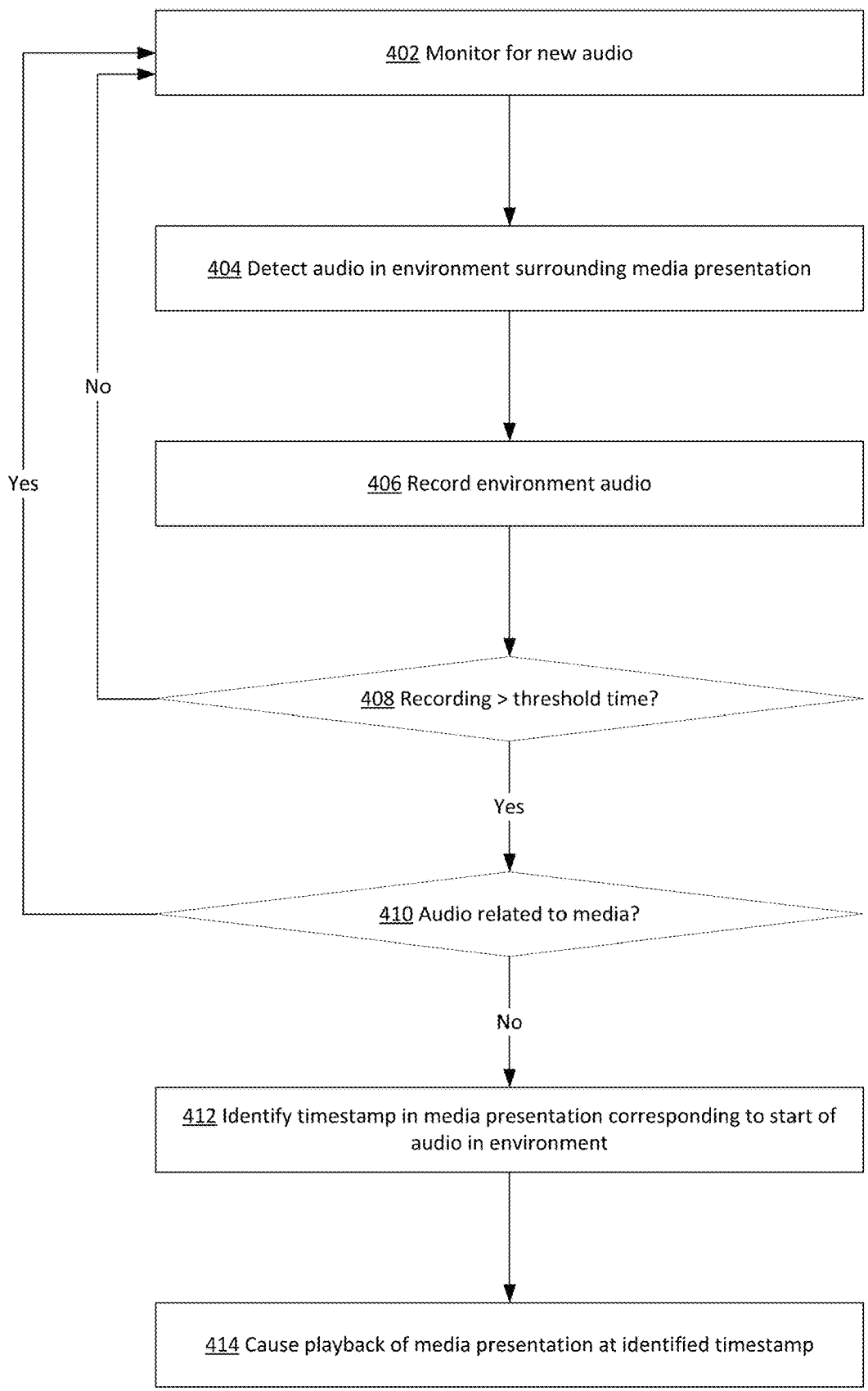
FIG. 4 depicts an example method for causing playback of a portion of a media presentation in response to detected audio.

FIG. 4 depicts an example method for causing playback of a portion of a media presentation in response to detected audio. While FIG. 4 is described with respect to actions performed by the replay server for the purpose of providing a clear example, one or more of the steps depicted may be performed by different devices. For example, any of the steps may be performed by the media presentation device and/or a device proximate but external to the media presentation device.

At step 402, input/output circuitry of a replay server monitors for new audio. For example, an audio device in a presentation environment may be configured to detect audio and transmit detected audio to the replay server. A process executing on the replay server may be configured to monitor incoming communications for a communication from an audio device indicating that audio was detected in the presentation environment.

At step 404, control circuitry of the replay server detects audio in an environment of a media presentation. For example, a process executing on the replay server may determine that a communication has been received indicating that audio has been detected in the environment of the media presentation.

At step 406, control circuitry of the replay server records audio in the environment. For example, the audio device may transmit the detected audio to the replay server. The replay server may store the detected audio in memory of the replay server.

At step 408, control circuitry of the replay server determines whether a length of the recorded audio is greater than a threshold time. For example, the replay server may determine if greater than a threshold time, such as five seconds, has passed since the initial detection of the audio. The replay server may perform the determination after audio is no longer detected in the presentation environment for more than a threshold length of time, such as five seconds, and/or continuously while audio is being detected in the presentation environment. If audio is still being detected in the presentation environment and the threshold time has not passed, the replay server may continue to monitor to determine if the length of the recorded audio is greater than the threshold time.

If the recorded audio is not greater than the threshold time, the process returns to step 402 and the input/output circuitry of the replay server monitors for new audio. For instance, after audio is no longer detected in the presentation environment, the replay server may compare the length of the recorded audio with the threshold time. The replay server may only proceed with the remaining steps of analyzing the audio if the length of the audio recording is greater than the threshold time.

If the recorded audio is greater than the threshold time, at step 410, control circuitry of the replay server determines whether the audio is related to the media being presented. For example, the control circuitry of the replay server may generate a transcription of the audio or request a transcription of the audio from an external server. The control circuitry of the replay server may compare the transcription of the audio to metadata of the media being presented to determine if the transcription of the audio relates to the media being presented using the methods described herein. If the control circuitry of the replay server determines that the audio is related to the media being presented, the process returns to step 402 and the input/output circuitry of the replay server monitors for new audio.

If the control circuitry of the replay server determines that the audio is not related to the media being presented, at step 412, control circuitry of the replay server identifies a timestamp in the media presentation corresponding to the start of the audio in the environment. The timestamp may comprise a timestamp of the media presentation when the audio started or a timestamp determined based on when the audio started, such as a few seconds before the audio started or at the beginning of a scene.

At step 414, the replay server causes playback of the media presentation at the identified timestamp. For example, the replay server may cause an application on the media presentation device to begin playing the media presentation at the identified timestamp.

Example Implementation: Hardware and Software Overview

Figure 5:
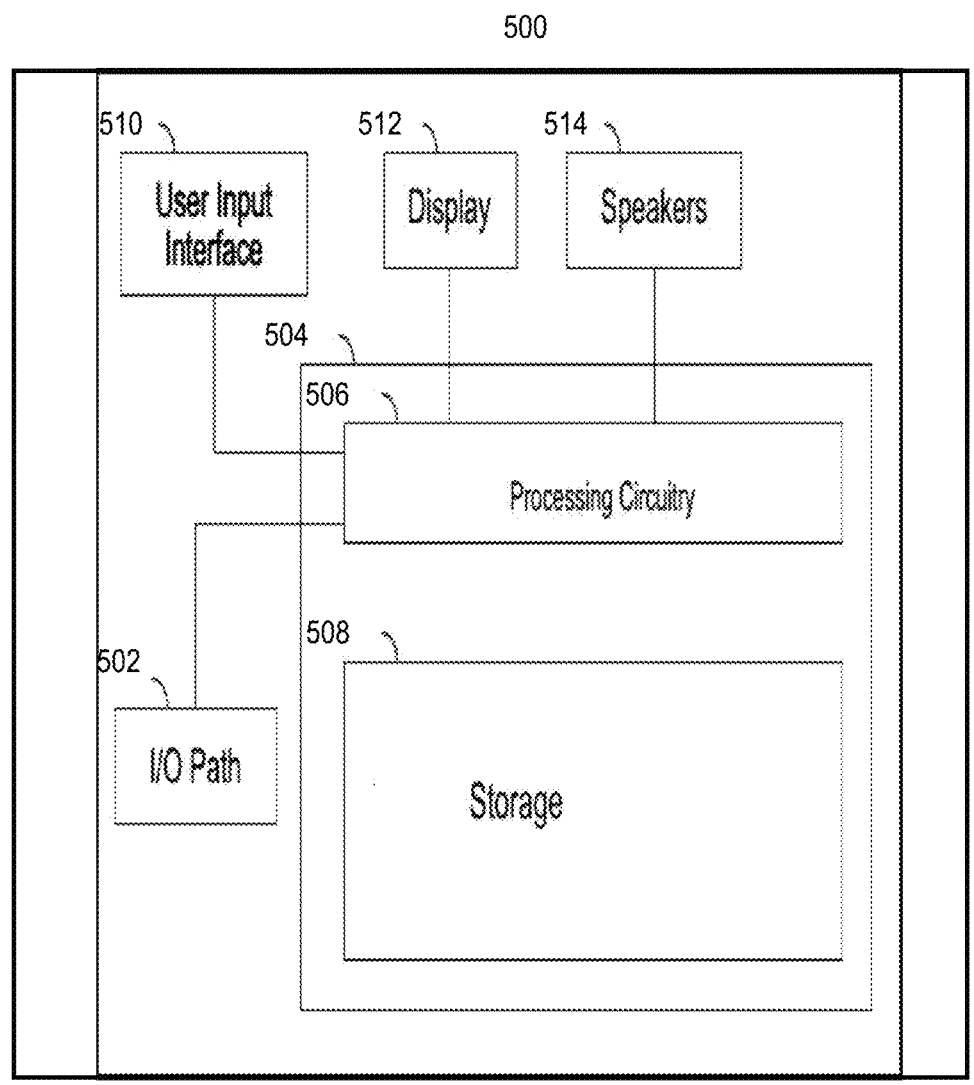
FIG. 5 depicts a block diagram of an illustrative media system, in accordance with some embodiments of the disclosure.

FIG. 5 depicts a generalized embodiment of an illustrative device (e.g., audio device 102, media presentation device 104, or replay server 106) that detects audio and causes replay of a portion of a media presentation if the audio is determined to not relate to the media presentation. Device 500 may be any of a plurality of user devices such as a smartphone, a tablet, personal computer, set-top box, server computer, etc. (discussed further below with respect to FIG. 6). Device 500 may receive the notification data via input/output (hereinafter "I/O") path 502. I/O path 502 may provide a notification data, application updates, or other data to control circuitry 504, which includes processing circuitry 506 and storage 508. Control circuitry 504 may be used to send and receive commands, requests, and other suitable data using I/O path 502. I/O path 502 may comprise circuitry that connects control circuitry 504 (and specifically processing circuitry 506) to one or more communications paths (described below in relation to FIG. 6). I/O functions may be provided by one or more of these communications paths but are shown as a single path in FIG. 5 to avoid overcomplicating the drawing. I/O path 502 may comprise circuitry for transmitting messages over network 614 for example, when directed by control circuitry 504 to transmit said messages. In some embodiments, I/O path 502 may comprise circuitry that includes wires and/or busses connected to a physical network port, e.g. an ethernet port, a wireless WiFi port, cellular communication port, or any other type of suitable physical port.

Control circuitry 504 may be based on any suitable processing circuitry such as processing circuitry 506. Processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., quad-core). In some embodiments, processing circuitry may be distributed across multiple separate processor or processing units, for example, multiple of the same type of processing units (e.g., two Intel Core i7 processors) or multiple different processors (e.g., Ryzen processor with integrated CPU and GPU processing cores) or may include a multi-core processor (e.g., dual-core, quad-core, hexa-core, or any suitable number of cores) or supercomputer. In some embodiments, control circuitry 504 executes instructions for an application stored in memory (e.g., memory 508). In some implementations, any action performed by control circuitry 504 may be based on instructions received from an application executing on device 500.

The circuitry described herein, including, for example, tuning, audio generating, encoding, decoding, encrypting, decrypting, scaler, and analog/digital circuitry, may be implemented using software running on one or more general purpose or specialized processors. If storage 508 is provided as a separate device from user equipment device 500, the tuning and encoding circuitry may be associated with storage 508.

Storage 508 may be any device for storing electronic data, such as random-access memory, solid state devices, quantum storage devices, hard disk drives, non-volatile memory or any other suitable fixed or removable storage devices, and/or any combination of the same. Control circuitry 504 may allocate portions of storage 508 for various purposes such as caching application instructions, recording media assets, storing portions of a media asset, buffering segments of media, etc. As described herein, storage 508 may be used to store one or more LUTs storing a number of MAC addresses associated with a plurality of user equipment devices and their corresponding profile information.

A user may send instructions to control circuitry 504 using user input interface 510. User input interface 510 may be any suitable user input interface, such as a remote control, mouse, trackball, keypad, keyboard, touchscreen, touchpad, stylus input, joystick, voice recognition interface, or other user input interfaces. Instructions to control circuitry 504 may be transmitted through I/O path 502, which could consist of a video tracking and detection mechanism, Internet of Things (IoT) and home automation triggers, emergency alert systems, and software or hardware communication pipelines and/or notification centers.

Display 512 may be provided as a stand-alone device or integrated with other elements of each one of user equipment device 500. For example, display 512 may be a touchscreen or touch-sensitive display, a projector, or a casting device. In such circumstances, user input interface 55 may be integrated with or combined with display 512. Display 512 may be one or more of a monitor, a television, a liquid-crystal display (LCD) for a mobile device, silicon display, e-ink display, light-emitting diode (LED) display, or any other suitable equipment for displaying visual images. Graphics processing circuitry may generate the output to the display 512. In some embodiments, the graphics processing circuitry may be external to processing circuitry 506 (e.g., as a graphics processing card that communicates with processing circuitry 506 via I/O path 502) or may be internal to processing circuitry 506 or control circuitry 504 (e.g., on a same silicone die as control circuitry 504 or processing circuitry 506). In some embodiments, the graphics processing circuitry may be used to receive, display, and play content.

Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514. The speakers 514 may be part of, but not limited to, a home automation system.

Streaming applications may be, for example, stand-alone applications implemented on user devices. For example, the streaming application may be implemented as software or a set of executable instructions, which may be stored in non-transitory storage 508 and executed by control circuitry 504 of a user device 602, 604, 606. In such an approach, instructions of the streaming application are stored locally (e.g., in storage 508), and data for use by the application is downloaded on a periodic basis (e.g., from an out-of-band feed, from an Internet resource, or using another suitable approach). Control circuitry 504 may retrieve instructions of the streaming application from storage 508 and process the instructions to generate any of the displays discussed herein. Based on the processed instructions, control circuitry 504 may determine what action to perform when user input is received from input interface 510.

Figure 6:
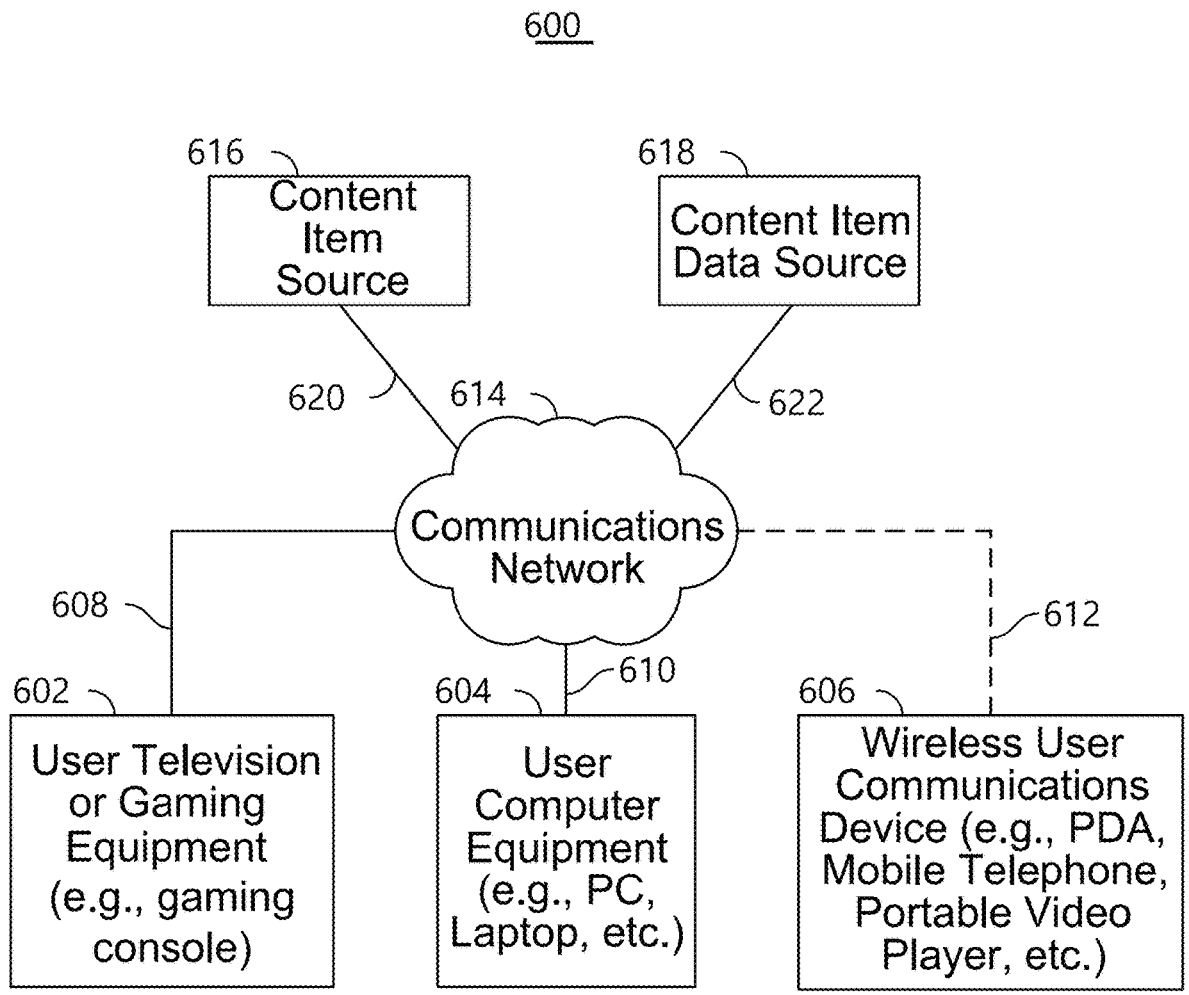
FIG. 6 depicts an example method for dynamically routing notifications based on dynamically identified rules based on the received notification.

FIG. 6 depicts an example of a media system in accordance with some embodiments of the disclosure, in which user equipment device 500 can be implemented in the media system 600 of FIG. 6 as audio device 102, media presentation device 104, replay server 106, or any other type of user equipment suitable for accessing media. For simplicity, these devices may be referred to herein collectively as user equipment or a user device. User equipment, on which the media application or the streaming application is implemented, may function as a stand-alone device or may be part of a network of devices. Various network configurations of devices may be implemented and are discussed in more detail below.

User television equipment 602 may include a set-top box, an integrated receiver decoder (IRD) for handling satellite television, a television set, a digital storage device, or other user television equipment. One or more of these devices may be integrated to be a single device, if desired. User computer equipment 604 may include a PC, a laptop, a streaming content aggregator, a PC media center, or other user computer equipment. It may include devices like digital assistance, smart speakers, and/or home automation. Wireless user communications device 606 may include a smartphone, a portable video player, a portable music player, a portable gaming machine, a tablet, a wireless streaming device or other wireless device. It should be noted that the lines are blurred when trying to classify a device as one of the above devices and one device may be categorized into one or more of the categories listed above.

In system 600, there are typically more than one of each type of user equipment, but only one of each is shown in FIG. 6 to avoid overcomplicating the drawing. In addition, each user may utilize more than one type of user equipment (e.g., a user may have a computer and a tablet) and also more than one of each type of user equipment device (e.g., a user may have multiple television sets).

The user equipment may be coupled to communications network 614. Namely, user television equipment 602, user computer equipment 604, and wireless user communications device 606 are coupled to communications network 614 via communications paths 608, 65, and 612, respectively. Communications network 614 is used by the user equipment to obtain the video stream. Communications network 614 may be one or more networks including the Internet, a mobile phone network, ad-hoc network, or other types of communications network or combination of communications networks. Paths 608, 65, and 612 may separately or together include one or more communications paths, including any suitable wireless communications path. Path 612 is drawn as a dotted line to indicate it is a wireless path. Communications with the user equipment may be provided by one or more of these communications paths but are shown as a single path in FIG. 6 to avoid overcomplicating the drawing. The user equipment devices may communicate with each other directly through an indirect path via communications network 614.

System 600 includes content item source 616 and content item data source 618 coupled to communications network 614 via communications paths 620 and 622, respectively. Paths 620 and 622 may include any of the communications paths described above in connection with paths 608, 610, and 612. Communications with the content item source 616 and content item data source 618 may be exchanged over one or more communications paths but are shown as a single path in FIG. 6 to avoid overcomplicating the drawing. In addition, there may be more than one of each of content item source 616 and content item data source 618, but only one of each is shown in FIG. 6 to avoid overcomplicating the drawing. In some embodiments, content item source 616 and content item data source 618 are integrated as one source device. Although communications between sources 616 and 618 with user equipment are shown as through communications network 614, in some embodiments, sources 616 and 618 may communicate directly with user equipment devices 602, 604, and 606 via communications paths (not shown) such as those described above in connection with paths 608, 610, and 612.

Content item source 616 or content item data source 618 may include one or more types of media distribution equipment such as a media server, cable system headend, satellite distribution facility, intermediate distribution facilities and/or servers, Internet providers, on-demand media servers, and other media providers. Content item source 616 or content item data source 618 may be the originator of media content or may not be the originator of media content. Content item source 616 or content item data source 618 may also include a remote media server used to store different types of media content (including a media asset selected by a user), in a location remote from any of the user equipment. Systems and methods for providing remotely stored media to user equipment are discussed in greater detail in connection with Ellis et al., U.S. Pat. No. 7,761,892, issued Jul. 20, 2010, which is hereby incorporated by reference herein in its entirety.

System 600 is intended to illustrate a number of approaches, or network configurations, by which user equipment devices and sources of media content and guidance data may communicate with each other for the purpose of accessing media and data related to the media. The configuration of the devices and paths in system 600 may change without departing from the scope of the present disclosure.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods. For example, processes 500, 600 and 1300 can be performed on any of the devices shown in FIG. 1 or 5-6. Additionally, any of the steps in process of FIG. 4 can be performed in any order, can be omitted, and/or can be combined with any of the steps from any other process.

What is claimed is:

1. A system comprising:
input/output circuitry configured to cause output of a media asset; and
control circuitry configured to:
    detect, during output of a media asset, a sound that is not part of the media asset;
    determine that a number of portions of the sound that relate to the media asset is less than a threshold;
    based at least in part on the determining that a number of portions of the sound that relate to the media asset is less than a threshold, determine that the sound is not related to the media asset; and
    based at least in part on determining that the sound is not related to the media asset, cause replay of a portion of the media asset.

2. The system of claim 1, wherein the control circuitry configured to determine that the number of portions of the sound that relate to the media asset is less than the threshold is further configured to compare the sound with metadata corresponding to the media asset.

3. The system of claim 2, wherein the metadata comprises one or more of subtitles for the media asset, a title of the media asset, names of actors in the media asset, or genre data.

4. The system of claim 1, wherein in the sound comprises words spoken by a user.

5. The system of claim 4, wherein the control circuitry configured to determine that the number of portions of the sound that relate to the media asset is less than the threshold is further configured to determine that a number or percentage of the words spoken that do not match metadata corresponding to the media asset is less than a threshold value.

6. The system of claim 1, wherein the control circuitry is further configured to:
    based at least in part on detecting the sound, identify a timestamp in the media asset corresponding to a start of the sound;
    wherein the control circuitry configured to cause replay of the portion of the media asset is further configured to cause replay of the media asset from the identified timestamp.

7. The system of claim 1, wherein the control circuitry is further configured to:
    based at least in part on detecting the sound, store the portion of the media asset that is to be replayed.

8. The system of claim 1, wherein the control circuitry is further configured to:

analyze the media asset at a time when the sound is detected to identify a portion of dialogue occurring in the media asset at the time when the sound was detected; and determine a timestamp in the media asset corresponding to a start of the identified portion of dialogue;

wherein the control circuitry configured to cause replay of the portion of the media asset is further configured to cause replay of the media asset at the determined timestamp.

9. The system of claim 1, wherein the control circuitry is further configured to:

based at least in part on the determining that the number of portions of the sound that relate to the media asset is less than the threshold, cause display, on a client device, of an option to replay the portion of the media asset and a countdown timer for responding to the option;

wherein the control circuitry configured to cause replay of the portion of the media asset is further configured to do so based at least in part on receiving input selecting, prior to a completion of a countdown of the countdown timer, the option to replay the portion of the media asset.

10. The system of claim 1, wherein the media asset is being output by a plurality of client devices in a media watch party, wherein the sound is detected as being audible in only a single environment corresponding to a client device of the plurality of client devices, and wherein the control circuitry is further configured to:

display, at the client device, an option to replay the portion of the media asset after conclusion of the media watch party;

wherein the control circuitry configured to cause replaying the portion of the media asset on the client device is further configured to do so based at least in part on receiving input selecting the option to replay the portion of the media asset.

11. A method comprising:

detecting, during output of a media asset, a sound that is not part of the media asset;

determining that a number of portions of the sound that relate to the media asset is less than a threshold;

based at least in part on the determining that a number of portions of the sound that relate to the media asset is less than a threshold, determining that the sound is not related to the media asset; and based at least in part on the determining that the sound is not related to the media asset, causing replay of a portion of the media asset.

12. The method of claim 11, further comprising: based at least in part on detecting the sound, storing the portion of the media asset that is to be replayed.

13. The method of claim 11, wherein determining that the number of portions of the sound that relate to the media asset is less than the threshold comprises comparing the sound with metadata corresponding to the media asset.

14. The method of claim 13, wherein the metadata comprises one or more of subtitles for the media asset, a title of the media asset, names of actors in the media asset, or genre data.

15. The method of claim 11, wherein in the sound comprises words spoken by a user.

16. The method of claim 15, wherein determining that the number of portions of that relate to the media asset is less than the threshold comprises determining that a number or percentage of the words spoken that match metadata corresponding to the media asset is less than a threshold value.

17. The method of claim 11, further comprising: based at least in part on the detecting the sound, identifying a timestamp in the media asset corresponding to a start of the sound; wherein causing replay of the portion of the media asset comprises causing replay of the media asset from the identified timestamp.

18. The method of claim 11, further comprising: analyzing the media asset at a time when the sound is detected to identify a portion of dialogue occurring in the media asset at the time when the sound was detected; and determining a timestamp in the media asset corresponding to a start of the identified portion of dialogue; wherein causing replay of the portion of the media asset comprises causing replay of the media asset at the determined timestamp.

19. The method of claim 11, further comprising: based at least in part on the determining that the number of portions of the sound that relate to the media asset is less than the threshold, causing display, on a client device, of an option to replay the portion of the media asset and a countdown timer for responding to the option; wherein causing replay of the portion of the media asset is performed further based at least in part on receiving input selecting, prior to completion of a countdown of the countdown timer, the option to replay the portion of the media asset.

20. The method of claim 11, wherein the media asset is being output by a plurality of client devices in a media watch party, wherein the sound is detected as being audible in only a single environment corresponding to a client device of the plurality of client devices, and wherein the method further comprises: displaying, at the client device, an option to replay the portion of the media asset after conclusion of the media watch party; wherein causing replaying the portion of the media asset on the client device is performed further based at least in part on receiving input selecting the option to replay the portion of the media asset.

* * * * *

UNITED STATES PATENT AND TRADEMARK OFFICE
CERTIFICATE OF CORRECTION

PATENT NO. : 12,244,890 B2
APPLICATION NO. : 18/108253
DATED : March 4, 2025
INVENTOR(S) : Serhad Doken It is certified that error appears in the above-identified patent and that said Letters Patent is hereby corrected as shown below:

In the Claims

Claim 5, Column 14, Line 51, delete "do not"

Signed and Sealed this
Sixteenth Day of September, 2025

Coke Morgan Stewart
*Acting Director of the United States Patent and Trademark Office*